(12) United States Patent
Kaplan et al.

(10) Patent No.: US 9,286,233 B2
(45) Date of Patent: Mar. 15, 2016

(54) OLDEST OPERATION TRANSLATION LOOK-ASIDE BUFFER

(75) Inventors: David Kaplan, Austin, TX (US); John M. King, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 118 days.

(21) Appl. No.: 13/599,269

(22) Filed: Aug. 30, 2012

(65) Prior Publication Data

US 2014/0068175 A1 Mar. 6, 2014

(51) Int. Cl.
| G06F 13/00 | (2006.01) |
| G06F 12/10 | (2006.01) |
| G06F 9/30 | (2006.01) |
| G06F 12/08 | (2006.01) |

(52) U.S. Cl.
CPC .............. *G06F 12/1027* (2013.01); *G06F 9/30* (2013.01); *G06F 12/0888* (2013.01)

(58) Field of Classification Search
None
See application file for complete search history.

(56) References Cited

U.S. PATENT DOCUMENTS

| 5,390,310 | A | * | 2/1995 | Welland | 711/203 |
| 5,491,806 | A | * | 2/1996 | Horstmann et al. | 711/207 |
| 5,694,574 | A | * | 12/1997 | Abramson et al. | 711/140 |
| 5,751,983 | A | * | 5/1998 | Abramson et al. | 712/216 |
| 5,802,568 | A | * | 9/1998 | Csoppenszky | 711/136 |
| 5,895,503 | A | * | 4/1999 | Belgard | G06F 12/1036 |
| | | | | | 711/200 |
| 5,898,854 | A | * | 4/1999 | Abramson et al. | 712/218 |
| 6,266,744 | B1 | * | 7/2001 | Hughes et al. | 711/146 |
| 6,415,360 | B1 | * | 7/2002 | Hughes et al. | 711/139 |
| 6,539,457 | B1 | * | 3/2003 | Mulla et al. | 711/131 |
| 2002/0199067 | A1 | * | 12/2002 | Patel | G06F 12/0831 |
| | | | | | 711/145 |
| 2003/0177332 | A1 | * | 9/2003 | Shiota | 711/203 |
| 2006/0277390 | A1 | * | 12/2006 | Zuraski et al. | 711/207 |
| 2010/0299499 | A1 | * | 11/2010 | Golla et al. | 712/206 |
| 2012/0124296 | A1 | * | 5/2012 | Bryant | 711/136 |
| 2013/0103923 | A1 | * | 4/2013 | Pan | 711/207 |

OTHER PUBLICATIONS

Thomas et.al. "Translation Caching: Skip, Don't Walk (the Page Table)" ACM Jun. 19-23, 2010, section 2, 3.*

* cited by examiner

*Primary Examiner* — Yaima Rigol
*Assistant Examiner* — Tasnima Matin

(57) ABSTRACT

A method is provided for dispatching a load operation to a processing device and determining that the operation is the oldest load operation. The method also includes executing the operation in response to determining the operation is the oldest load operation. Computer readable storage media for performing the method are also provided. An apparatus is provided that includes a translation look-aside buffer (TLB) content addressable memory (CAM), and includes an oldest operation storage buffer operationally coupled to the TLB CAM. The apparatus also includes an output multiplexor operationally coupled to the TLB CAM and to the oldest operation storage buffer. Computer readable storage media for adapting a fabrication facility to manufacture the apparatus are also provided.

32 Claims, 5 Drawing Sheets

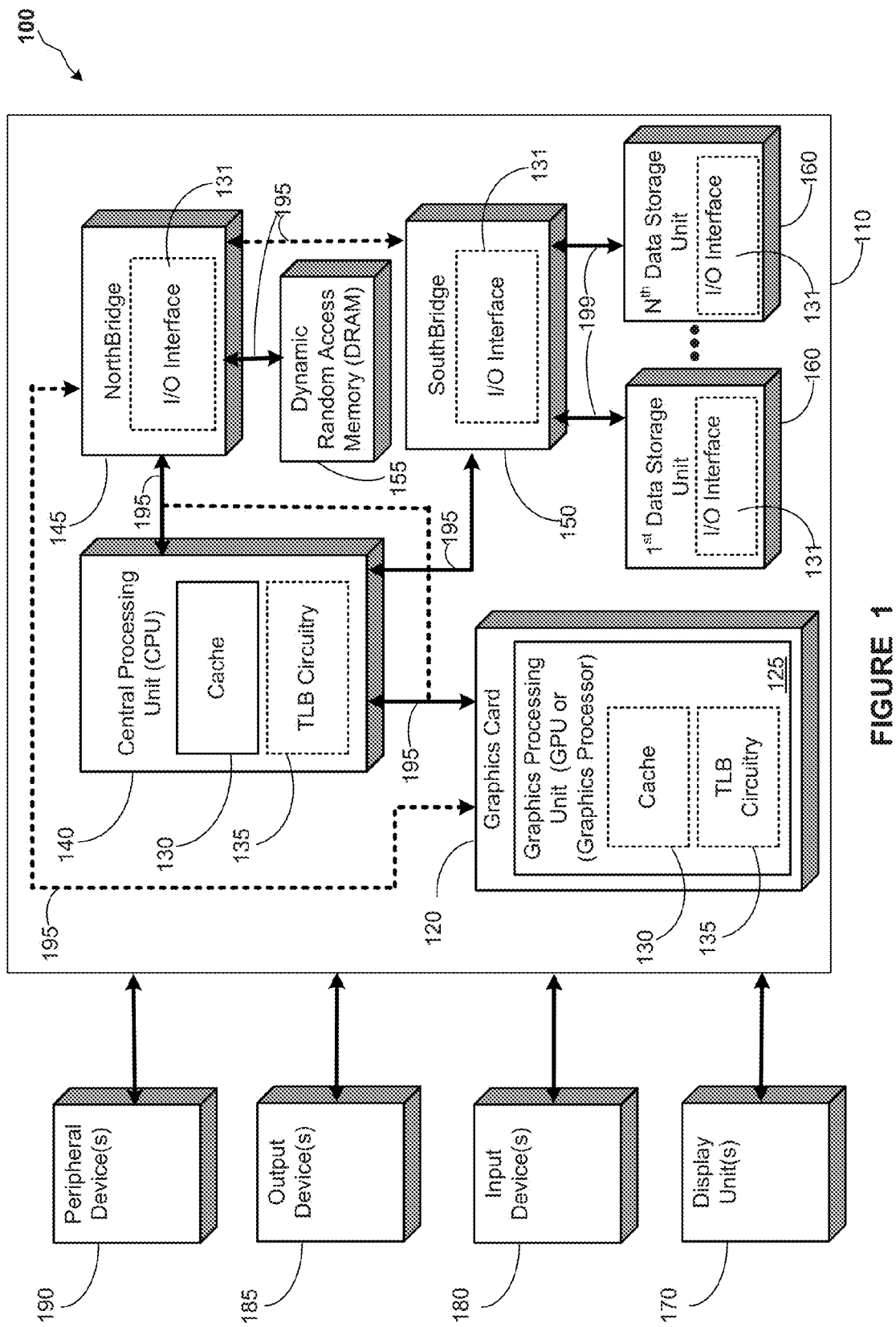

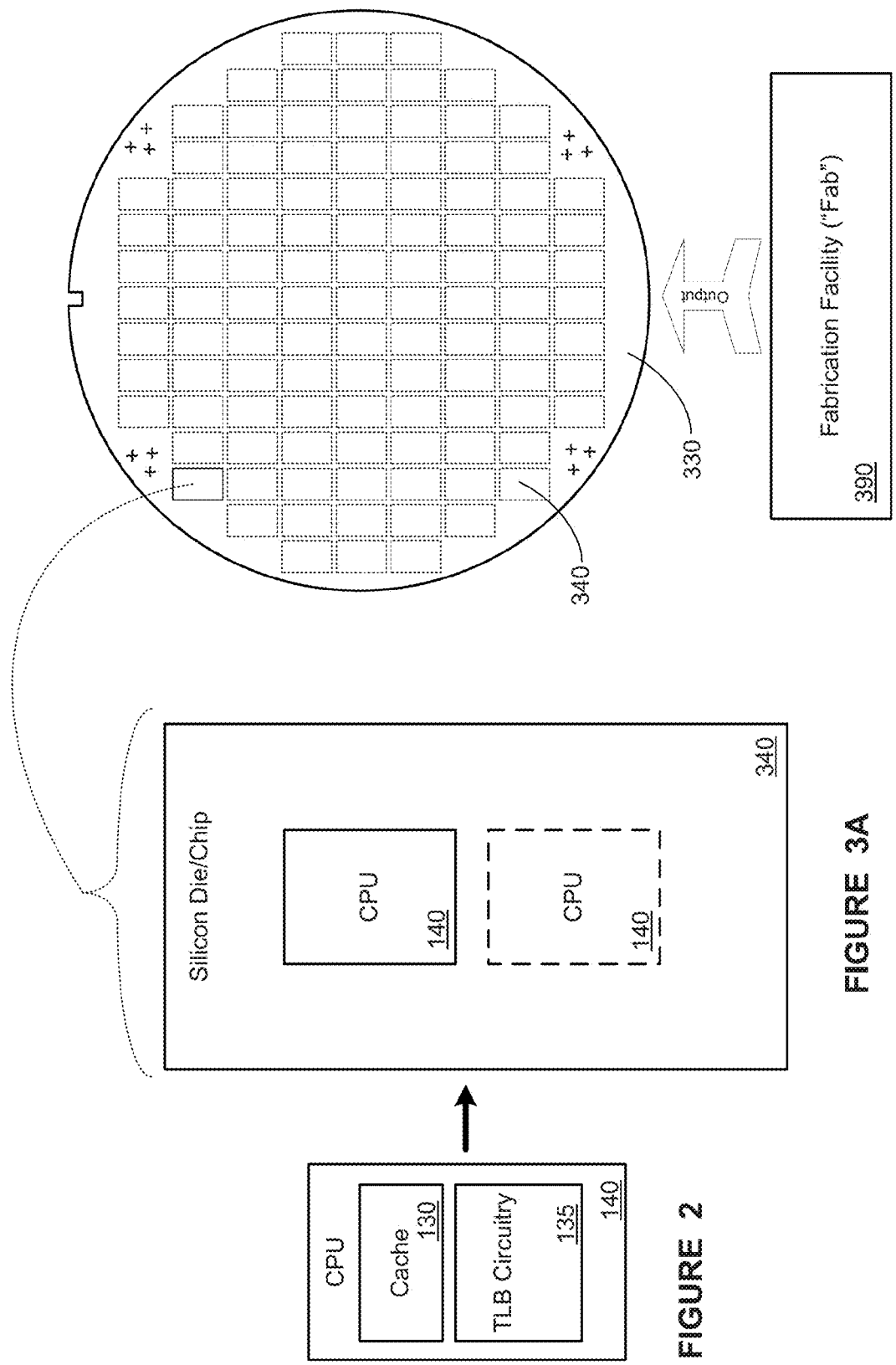

OLDEST OPERATION TRANSLATION LOOK-ASIDE BUFFER

BACKGROUND

1. Field of the Invention

Embodiments presented herein relate generally to computing systems and processing devices, and, more particularly, to a method and apparatus for determining and executing the oldest load operation in a processing device.

2. Description of Related Art

Electrical circuits and devices that execute instructions and process data have evolved becoming faster and more complex. With the increased performance and low power demands of modern data processor architectures (e.g., multi-core processors), execution of speculative memory operations, as well as non-cacheable (e.g., memory-mapped I/O) instructions has become more complex. Designing a processor capable of executing these instructions efficiently, while avoiding problematic conditions including live-lock states and coherency problems, is particularly problematic.

In some previous solutions, load queues included special flip-flops to hold physical addresses and memory types for each load instruction. In some cases, each load queue included two sets of these flip-flops in case of a misaligned instruction. These previous solutions relied upon saving the TLB information (e.g., physical address and/or memory type) after a TLB hit for each load and using the saved information for subsequent processing. In such an implementation, the saved information would be used even if the TLB would return a different status (e.g., a hit was previously returned by the TLB, but the TLB most recently returned miss). Further, although these implementations may be architecturally correct, the previous solutions require a significant number of extra flip-flops in their respective designs, for holding this TLB information.

Embodiments presented herein eliminate or alleviate the problems inherent in the state of the art described above.

SUMMARY OF EMBODIMENTS

In one aspect of the present invention, a method is provided. The method includes dispatching a load operation to a processing device and determining that the operation is the oldest load operation. The method also includes executing the operation in response to determining the operation is the oldest load operation.

In another aspect of the invention, a non-transitory, computer-readable storage device encoded with data that, when executed by a processing device, adapts the processing device to perform a method is provided. The method includes dispatching a load operation to a processing device and determining that the operation is the oldest load operation. The method also includes executing the operation in response to determining the operation is the oldest load operation.

In another aspect of the invention, an apparatus is provided. The apparatus includes a translation look-aside buffer (TLB) content addressable memory (CAM) and an oldest operation storage buffer operationally coupled to the TLB CAM. The apparatus also includes an output multiplexor operationally coupled to the TLB CAM and to the oldest operation storage buffer.

In yet another aspect of the invention, a non-transitory, computer-readable storage device encoded with data that, when executed by a fabrication facility, adapts the fabrication facility to manufacture an apparatus is provided. The apparatus includes a translation look-aside buffer (TLB) content addressable memory (CAM) and an oldest operation storage buffer operationally coupled to the TLB CAM. The apparatus also includes an output multiplexor operationally coupled to the TLB CAM and to the oldest operation storage buffer.

BRIEF DESCRIPTION OF THE DRAWINGS

The embodiments herein may be understood by reference to the following description taken in conjunction with the accompanying drawings, in which the leftmost significant digit(s) in the reference numerals denote(s) the first figure in which the respective reference numerals appear, and in which:

FIG. 1 schematically illustrates a simplified block diagram of a computer system, according to one embodiment;

FIG. 2 shows a simplified block diagram of a circuit that includes a central processing unit (CPU) and translation look-aside buffer (TLB) circuitry, according to one embodiment;

FIG. 3A provides a representation of a silicon die/chip that includes one or more circuits as shown in FIG. 2, according to one embodiment;

FIG. 3B provides a representation of a silicon wafer which includes one or more die/chips that may be produced in a fabrication facility, according to one embodiment;

Figure 4A:
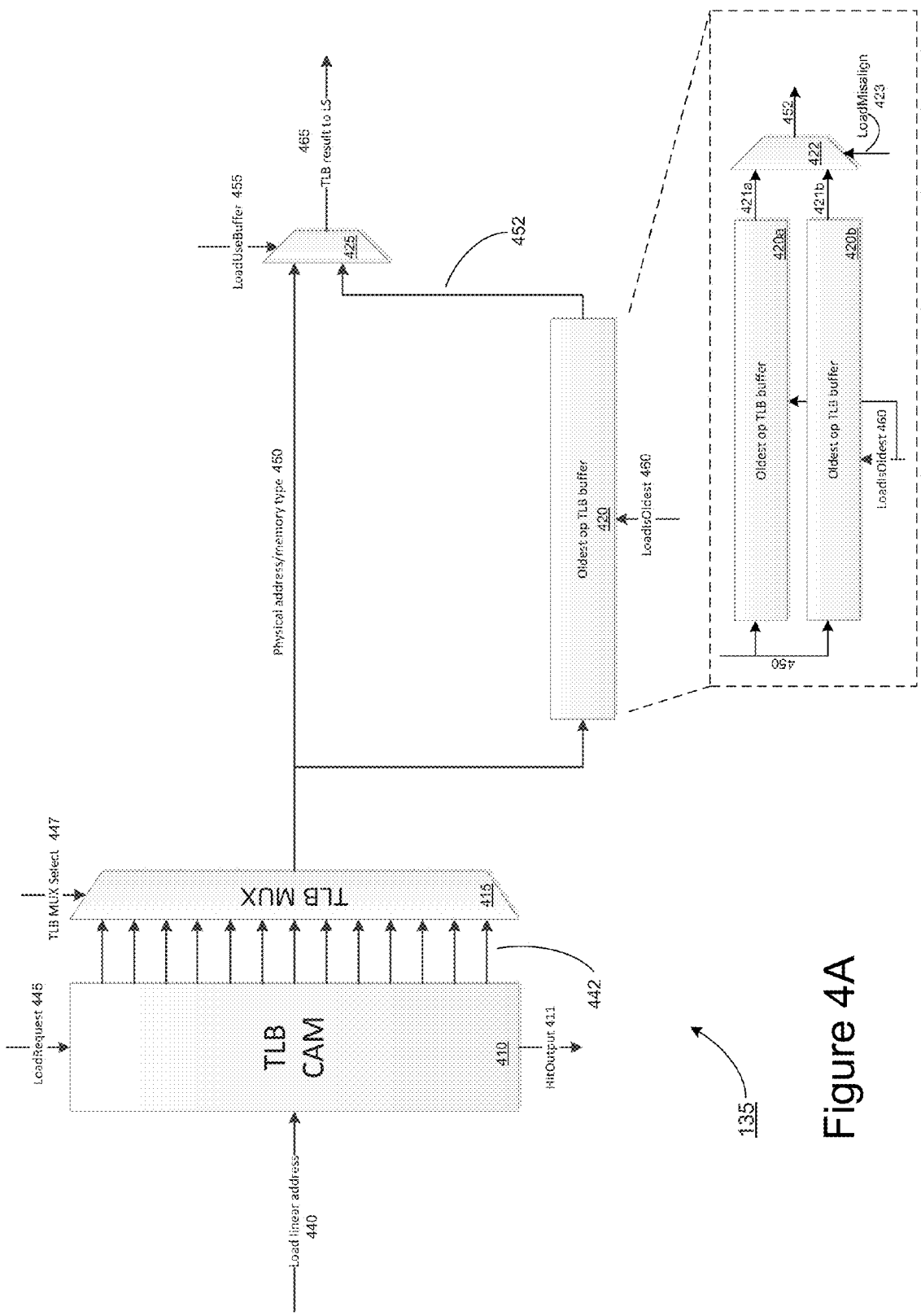
FIG. 4A illustrates a simplified block diagram of the translation look-aside buffer (TLB) circuitry of FIG. 2, according to one embodiment.

While the embodiments herein are susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the scope of the invention as defined by the appended claims.

DETAILED DESCRIPTION

Illustrative embodiments of the instant application are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and/or business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present application will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present embodiments. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored. Additionally, the term "approximately," when used in the context of one value being approximately equal to another, may mean that the values are "about" equal to each other. For example, when measured, the values may be close enough to be determined as equal by one of ordinary skill in the art.

As discussed herein, an "instruction" may be a programmer level (e.g., an x86 instruction or instruction related to an ARM architecture or the like). Further, x86 instructions may be broken down internally into multiple micro-instructions (which may be operated upon by, for example, a load store unit of a processor). As used herein, an "instruction" may be an instruction or operation as described above, or may be another instruction type as would be apparent to one of ordinary skill in the art having the benefit of this disclosure.

Embodiments presented herein generally relate to determining the oldest load operation in a processing device for execution through the use of an oldest operation TLB buffer that may be used to store the translation for the oldest load operation in the system. Processing devices (e.g., single- and multi-core microprocessors (CPUs) and graphics processors (GPUs)) may execute instructions that reference non-cacheable memory. That is, the data referenced by that instruction may be prohibited from being stored in a cache due system software policies. Non-cacheable loads, however, present an interesting problem to a load/store unit. Because non-cacheable data is not cached, loads that reference non-cacheable data (non-cacheable loads) are not permitted to be executed speculatively (in most architectures) by the processor. The determination of whether a load is cacheable or non-cacheable is done by the "memory type" associated with the linear address. A translation look-aside buffer (TLB) structure is typically used to cache linear-to-physical address translations as well as memory types for each linear address. However, there is no guarantee that upon multiple TLB lookups on behalf of the same instruction, the same result is returned from the TLB. In particular, if on one "pick" (execution through the main load pipeline) a load hits the TLB, on a second "pick" it may miss the TLB. Such a miss may occur due to a number of factors such as limitations on TLB size or the replacement of a TLB entry by an unrelated instruction between the first and second "picks." This scenario of missing the TLB on subsequent "picks" is estimated to be uncommon, and as such need not require a high-performance solution; however it may be supported by the system. For this reason, it may be beneficial for the system to reliably determine that an instruction is the oldest operation in the system prior to its execution. The oldest operation TLB buffer may store the translation for a non-cacheable instruction (or cacheable instruction, in various embodiments) when it is determined to be the oldest instruction/operation in the system. Once the translation is stored in the oldest operation TLB buffer, the instruction/operation may be executed by the system because a TLB "hit" is guaranteed (i.e., the TLB translation will not be missing or changed) by virtue of the instruction being the oldest instruction in the system.

The execution of instructions that reference non-cacheable memory is also complicated in that misaligned loads (loads that span two or more pages) have special rules. In particular, to avoid consistency issues, both halves of a misaligned load must have a valid translation before the operation can be non-speculatively executed. In the case of an instruction that references cacheable memory, a misalign may be a load that spans two or more cache lines.

Additionally, when physical address flip-flops are not utilized in the load queues to hold each instruction's physical address, this introduces the potential for live-locks as it may be hard for the design to guarantee the oldest load in the machine can successfully make progress and complete. A live-lock problem may occur when a load cannot be executed until its translation (typically both halves of a misalign) is present in the TLB, but due to the presence of other instructions in the machine, this does not happen as the other instructions may continually kick out the oldest load's TLB entries. The embodiments described herein avoid this problem because the oldest load has a special buffer to hold its translation; that is, no other system component or other instruction/operation can use the oldest operation buffer in the TLB. As long as an address can get a valid translation one time the buffer will hold its translation from that point forward and it will not be dependent on its TLB entry remaining present in the TLB. It should be noted that while embodiments described herein may refer to the execution of non-cacheable instructions, the described embodiments may also have applicability to cacheable instructions, for example, in cases for preventing live-locks.

The embodiments described herein allow for removing the large amount of flip-flops previously required to hold the physical address and memory type for each load instruction. In addition to power savings, this may also decrease timing pressure in critical areas. Furthermore, this removal is estimated to result in no significant performance loss because it is estimated that most translations will in fact remain present in the TLB for multiple picks of the load instruction; however in the event that the translation does not remain present in the TLB, the embodiments described herein allow the system to still execute the oldest load operation and make forward progress. Finally, the embodiments described herein are very useful for avoiding live-lock type problems.

Turning now to FIG. 1, a block diagram of an exemplary computer system 100, in accordance with an embodiment of the present application, is illustrated. In various embodiments the computer system 100 may be a personal computer, a laptop computer, a handheld computer, a tablet computer, a mobile device, a telephone, a personal data assistant ("PDA"), a server, a mainframe, a work terminal, a music player, and/or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect "(PCI") Bus (not shown), PCI-Express Bus (not shown) an Accelerated Graphics Port ("AGP") Bus (also not shown), or any other computer system connection. It should be noted that embodiments of the present application are not limited by the connectivity of the graphics card 120 to the main computer structure 110. In one embodiment, the computer system 100 runs an operating system such as Linux, UNIX, Windows, Mac OS, and/or the like. In one or more embodiments, the computer system 100 may include one or more system registers (not shown) adapted to store values used by the computer system 100 during various operations.

In one embodiment, the graphics card 120 may contain a processing device such as a graphics processing unit (GPU) 125 used in processing graphics data. The GPU 125, in one embodiment, may include one or more embedded/non-embedded memories, such as one or more caches 130. The GPU caches 130 may be L1, L2, higher level, graphics specific/related, instruction, data and/or the like. In various embodiments, the embedded memory(ies) may be an embedded random access memory ("RAM"), an embedded static random access memory ("SRAM"), or an embedded dynamic random access memory ("DRAM"). In alternate embodiments, the memory(ies) may be on the graphics card 120 in addition to, or instead of, being embedded in the GPU 125, for example as DRAM 155 on the graphics card 120 as shown in FIG. 1. In various embodiments the graphics card 120 may be referred to as a circuit board or a printed circuit board or a daughter card or the like.

In one embodiment, the computer system 100 includes a processing device such as a central processing unit ("CPU") 140, which may be connected to a northbridge 145. In various embodiments, the CPU 140 may be a single- or multi-core processor, or may be a combination of one or more CPU cores and a GPU core on a single die/chip (such an AMD Fusion™ APU device). The CPU 140 may be of an x86 type architecture, an ARM type processor, and/or the like. In one embodiment, the CPU 140 may include one or more cache memories 130, such as, but not limited to, L1, L2, level 3 or higher, data, instruction and/or other cache types. In one or more embodiments, the CPU 140 may be a pipe-lined processor. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other computer system connection. For example, CPU 140, northbridge 145, GPU 125 may be included in a single package or as part of a single die or "chips" (not shown) or as a combination of packages. Alternative embodiments which alter the arrangement of various components illustrated as forming part of main structure 110 are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art and may comprise one or more memory modules; the type of RAM 155 does not limit the embodiments of the present application. For example, the RAM 155 may include one or more DIMMs. As referred to in this description, a memory may be a type of RAM, a cache or any other data storage structure referred to herein.

In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In one embodiment, the southbridge 150 may have one or more I/O interfaces 131, in addition to any other I/O interfaces 131 elsewhere in the computer system 100. In various embodiments, the southbridge 150 may be connected to one or more data storage units 160 using a data connection or bus 199. The data storage units 160 may be hard drives, solid state drives, magnetic tape, or any other writable media used for storing data. In one embodiment, one or more of the data storage units may be USB storage units and the data connection 199 may be a USB bus/connection. Additionally, the data storage units 160 may contain one or more I/O interfaces 131. In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In one or more embodiments, the computer system 100 may include translation look-aside buffer (TLB) circuitry 135. In one embodiment, the TLB circuitry 135 may include a components adapted to provide functionality for determining the oldest load instruction for execution in the computer system 100, the CPU 140 and/or the GPU 125. In other embodiments, components adapted to provide functionality for determining the oldest load instruction may reside in other system blocks, e.g., a retirement unit, re-order buffer (ROB) unit, and/or the like), or in a combination of the TLB circuitry and other system blocks. The components of the TLB circuitry 135 are discussed in further detail below, in FIG. 4A. The TLB circuitry 135 may comprise a silicon die/chip and include software, hardware and/or firmware components. In different embodiments, the TLB circuitry 135 may be packaged in any silicon die package or electronic component package as would be known to a person of ordinary skill in the art having the benefit of this disclosure. In alternate embodiments, the TLB circuitry 135 may be a circuit included in an existing computer component, such as, but not limited to, the CPU 140, the northbridge 145, the graphics card 120 and/or the GPU 125. In one embodiment, TLB circuitry 135 may be communicatively coupled to the CPU 140, the northbridge 145, the RAM/DRAM 155 and/or their respective connections 195. As used herein, the terms "TLB circuitry" or "TLB" (e.g., TLB circuitry 135) may be used to refer a physical TLB chip or to TLB circuitry included in a computer component, to circuitry of the TLB circuitry 135, or to the functionality implemented by the TLB. In accordance with one or more embodiments, the TLB circuitry 135 may function as, and/or be referred to as, a portion of a processing device. In some embodiments, some combination of the GPU 125, the CPU 140, the TLB circuitry 135 and/or any hardware/software computer 100 units respectively associated therewith, may collectively function as, and/or be collectively referred to as, a processing device. In one embodiment, the CPU 140 and TLB circuitry 135, or the CPU 140, the northbridge 145 and the TLB circuitry 135 and their respective interconnects may function as a processing device.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present application. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial bus ("USB") device, Zip Drive, external floppy drive, external hard drive, phone and/or broadband modem, router/gateway, access point and/or the like. The input, output, display and peripheral devices/units described herein may have USB connections in some embodiments. To the extent certain exemplary aspects of the computer system 100 are not described herein, such exemplary aspects may or may not be included in various embodiments without limiting the spirit and scope of the embodiments of the present application as would be understood by one of skill in the art.

Turning now to FIG. 2, a block diagram of an exemplary TLB circuitry 135, CPU 140 and/or northbridge 145, in accordance with an embodiment of the present application, is illustrated. In one embodiment, the TLB circuitry 135, CPU 140 and/or northbridge 145 may contain one or more cache memories 130. The TLB circuitry 135, CPU 140 and/or northbridge 145, in one embodiment, may include L1, L2 or other level cache memories 130. To the extent certain exemplary aspects of the TLB circuitry 135, CPU 140 and/or northbridge 145 and/or one or more cache memories 130 are not described herein, such exemplary aspects may or may not be included in various embodiments without limiting the spirit and scope of the embodiments of the present application as would be understood by one of skill in the art.

Turning now to FIG. 3A, in one embodiment, the TLB circuitry 135, CPU 140 and/or northbridge 145 and the cache(s) 130 may reside on a silicon chips/die 340 and/or in the computer system 100 components such as those depicted in FIG. 1. The silicon chip(s) 340 may be housed on the motherboard (e.g., 110) or other structure of the computer system 100. In one or more embodiments, there may be more than one TLB circuitry 135, CPU 140 and/or northbridge 145 and/or cache memory 130 on each silicon chip/die 340. As discussed above, various embodiments of the TLB circuitry 135, CPU 140 and/or northbridge 145 may be used in a wide variety of electronic devices.

Turning now to FIG. 3B in accordance with one embodiment, and as described above, one or more of the TLB circuitry 135, CPU 140 and/or northbridge 145 may be included on the silicon die/chips 340 (or computer chip). The silicon die/chips 340 may contain one or more different configurations of the TLB circuitry 135, CPU 140 and/or northbridge 145. The silicon chips 340 may be produced on a silicon wafer 330 in a fabrication facility (or "fab") 390. That is, the silicon wafers 330 and the silicon die/chips 340 may be referred to as the output, or product of, the fab 390. The silicon die/chips 340 may be used in electronic devices, such as those described above in this disclosure.

Turning now to FIG. 4A, a graphical representation of the TLB circuitry 135 in one or more embodiments, is shown. In one embodiment, the TLB circuitry 135 may include a TLB content addressable memory (CAM) 410, a TLB multiplexor (MUX) 415, an oldest operation TLB buffer 420, and/or an oldest-load multiplexor 425. As shown in FIG. 4A, a linear address for an operation to be executed may be provided to the TLB CAM 410 by a load linear address input line 440. The TLB CAM 410 may hold one or more entries relating to address of the operation to be executed. In one or more embodiments, TLB CAM 410 may check to determine if one of its one or more entries matches the linear address of the load operation presented on the load linear address input line 440 and provide the corresponding physical address and memory type to the TLB multiplexor 415 using address lines 442, based upon the TLB CAM load request line 445. In various embodiments, this may referred to as a "hit" or an "address hit" and may be output from the TLB CAM 410 on HitOutput line 411. In one embodiment, the HitOutput line may be a logical OR of one or more signals corresponding to one or more entries in the TLB CAM 410. The TLB multiplexor 415 may be used to select a particular address line 442 using the TLB multiplexor select line 447. In one or more embodiments, the TLB multiplexor select line 447 may be controlled according to the TLB CAM 410. For example, the TLB multiplexor select line 447 may be based upon a TLB "hit" in the TLB CAM 410 (e.g., HitOutput 411). The address line 442 may then be output to the oldest-load multiplexor 425 and/or the oldest operation TLB buffer 420 on physical address/memory type line 450. In one or more embodiments, the oldest operation TLB buffer 420 may store the translation for the oldest load based upon the LoadIsOldest line 460. In one or more embodiments, the oldest operation TLB buffer 420 may comprise one or more registers, flip-flops, and/or memory structures (e.g., small RAMs or caches) and may hold a physical address and memory type information for the oldest load in a processor or CPU (e.g., CPU 140 or GPU 125) of a processing device (e.g., computer system 100). It is contemplated that in computer systems, or the like, with multiple processors and/or multi-core processors, each processor and/or core may have its own TLB circuitry 135. The output of the oldest operation TLB buffer 420 may be connected to the oldest-load multiplexor 425 using buffer output line 452, in some embodiments. The oldest-load multiplexor 425 may select between the lines 450 and 452 by way of the LoadUseBuffer line 455. In one embodiment, the HitOutput 411 may be forced as asserted if the LoadUseBuffer line 455 is asserted. The output of the oldest-load multiplexor 425 (i.e., the TLB result) may, in one or more embodiments, be transmitted to a load/store unit (not shown) by line 465.

It should be noted that, in one or more embodiments, the oldest operation TLB buffer 420 may be duplicated or doubled in size (420a, 420b) to accommodate misaligned operations that span more than one cache line. In such an embodiment, an additional multiplexor 422, connected to the oldest operation TLB buffers 420a/420b via lines 421a/421b respectively, may be used to select between the misaligned segments stored in the oldest operation TLB buffers 420a/420b by using a select line LoadMisalign 423.

Table 1 one (below) shows values for three signals that may be used by the TLB circuitry 135, in one or more embodiments, to affect the operation of the TLB circuitry 135.

TABLE 1

| LoadRequest | LoadIsOldest | LoadUseBuffer | Description |
| --- | --- | --- | --- |
| 1 | 0 | X ("Don't Care") | Normal TLB lookup |
| 1 | 1 | 0 | TLB lookup; store the translation in the oldest operation TLB buffer upon a TLB "hit" |
| 1 | 1 | 1 | Bypass the TLB CAM, instead use the translation from the oldest operation TLB buffer |

In Table 1, as in accordance with one embodiment, the LoadRequest signal may correspond to the TLB CAM load request line 445, as shown in FIG. 4A. In accordance with one embodiment, the LoadIsOldest signal may correspond to the signal on the LoadIsOldest line 460, as shown in FIG. 4A. In accordance with one embodiment, the LoadUseBuffer signal may correspond to the signal on the LoadUseBuffer line 455, as shown in FIG. 4A. The functionality affected by the signals shown in Table 1, in accordance with the embodiments depicted herein, is explained in further detail below with respect to FIG. 5.

Figure 4B:
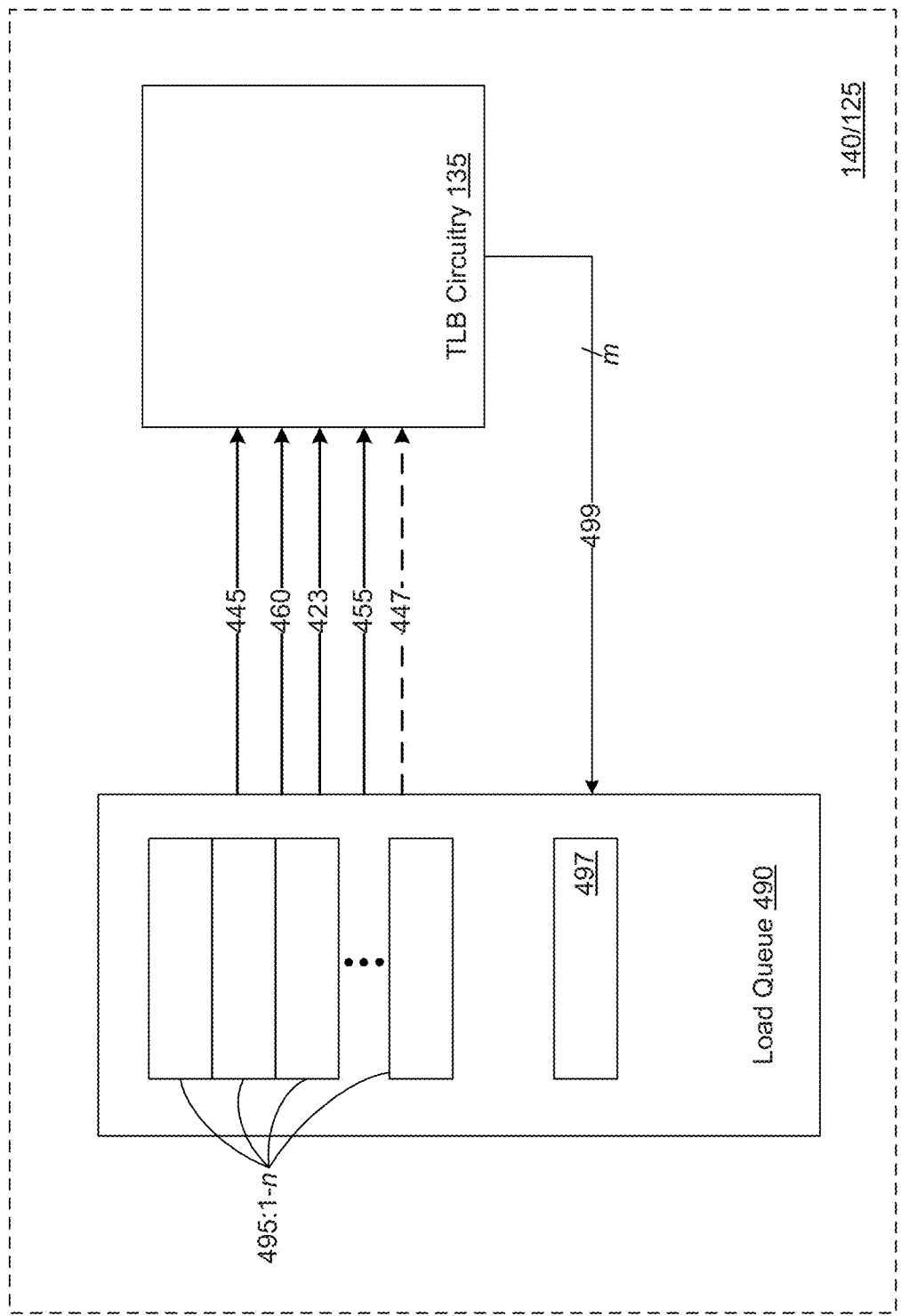
FIG. 4B illustrates a simplified block diagram of a load queue in connection with the translation look-aside buffer (TLB) circuitry of FIG. 2, according to one embodiment.

Turning now to FIG. 4B, a graphical representation of the TLB circuitry 135 and its connections to an exemplary load queue 490, in accordance with one or more embodiments, is shown. In one embodiment, the load queue 490 and the TLB circuitry may be part of a CPU 140 and/or a GPU 125. The load queue 490, may in one or more embodiments, provide one or more control signals to the TLB circuitry 135 (as exemplarily depicted (FIG. 4) and described above. The load queue 490 may hold one or more instruction entries 495 (1-n) which may correspond to one or more instructions that a computer system (e.g., 100) or a CPU/GPU (e.g., 140/125) may wish to execute. The one or more instruction entries 495 (1-n) may include address data, memory type data, instruction type data, instruction state data, the "pick" number of the instruction (described in further detail with respect to FIG. 5 below) and/or any other relevant data as would be understood by one of ordinary skill in the art having the benefit of this disclosure. Based upon the data of the one or more instruction entries 495 (1-n), the load queue 490 may transmit one or more signals (423, 445, 447, 455, 460 as described above with respect to FIG. 4A) to the TLB circuitry 135. In one embodiment, the load queue may provide the TLB multiplexor select line 447 to the TLB circuitry 135, while in other embodiments the TLB CAM 410 may provide this signal. In some embodiments, the TLB multiplexor select line 447 may comprise a combination of signals from the load queue 490 and the TLB CAM 410.

In one or more embodiments, the TLB circuitry 135 may provide one or more (m) signals 499 to the load queue 490. The load queue 490 may use the one or more (m) signals 499 to a state machine/algorithm 497. The state machine/algorithm 497 may then update the contents of one or more instruction entries 495 (1-n) based upon the received one or more (m) signals 499 from the TLB circuitry 135. For example, instruction state data relating to whether the instruction is the oldest load in the system may be transmitted in the one or more (m) signals 499 from the TLB circuitry 135 to the load queue 490, or in the alternative, from a retirement unit or an ROB unit to the load queue 490, where the one or more (m) signals 499 may include information related to various TLB states (e.g., "hit", "miss", etc.). Based upon the determination by the state machine/algorithm 497, one or more of the instruction entries 495 (1-n) may be updated.

Figure 5:
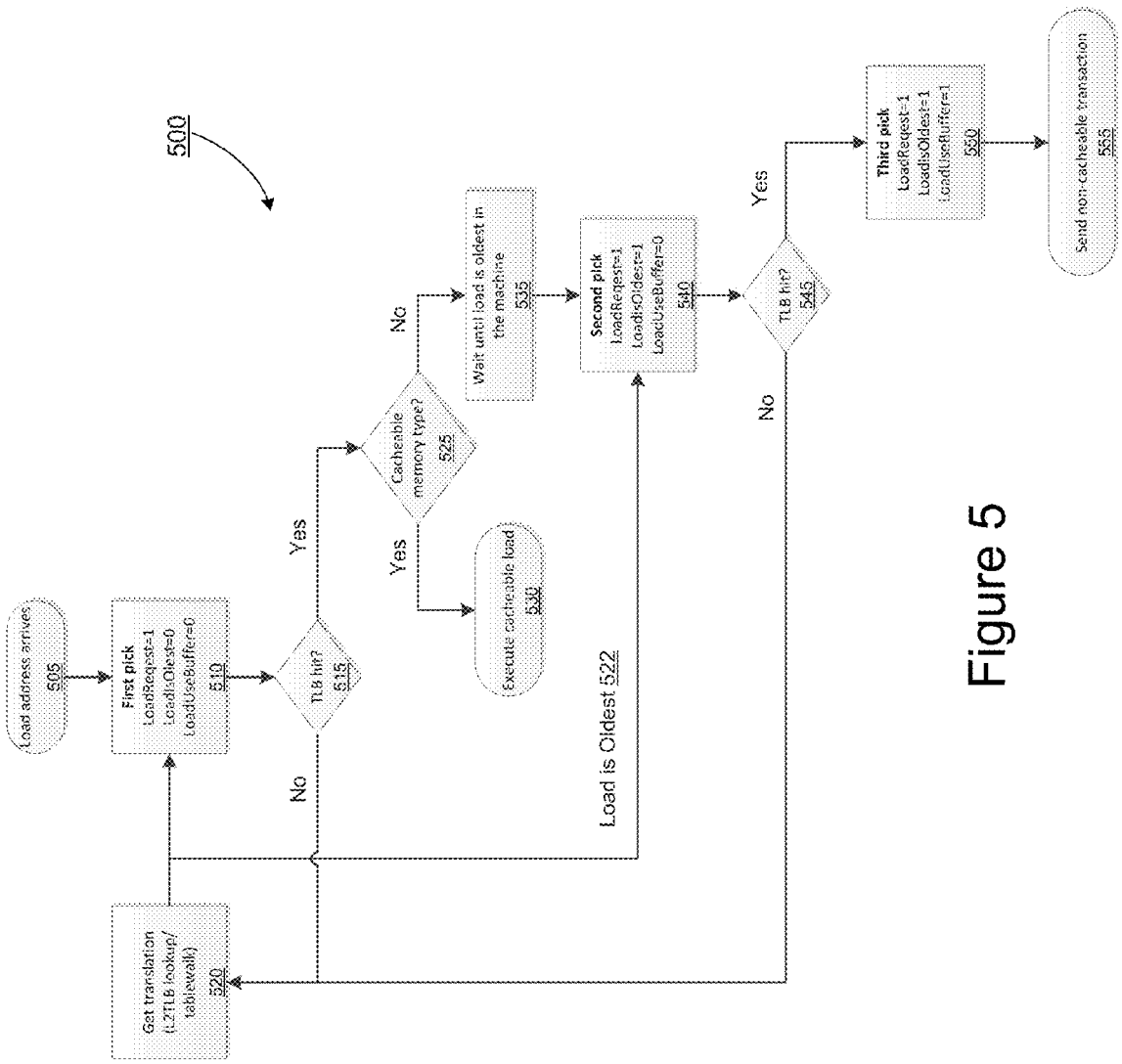
FIG. 5 illustrates a flowchart depicting determining and executing the oldest load operation in a processing device, according to one embodiment.

Turning now to FIG. 5, an exemplary flowchart depicting determination for execution of the oldest load operation in a processing device, in one or more embodiments, is shown. FIG. 5 depicts a nested, iterative selection process 500 that may be performed by the TLB circuitry 135 in one or more embodiments, as shown in FIGS. 4A-4B and described above. The description below, in accordance with one embodiment, shows a flow for an aligned operation. However, one of ordinary skill in the art, having the benefit of this disclosure, will realize that the flow and embodiments described herein may be modified to accommodate misaligned load instructions as well.

In one or more embodiments, operations may be first dispatched to a load/store (LS) unit (not shown) upon which the operations may wait for their linear addresses to be generated by an address generation unit (AGU) (not shown). The detailed functions and operations of the LS unit and the AGU are known in the art and are not discussed in detail except as pertaining to the embodiments described herein. After an address is determined for an operation, the linear address for the operation may be transmitted to the TLB circuitry (e.g., TLB circuitry 135) and/or a load queue at 505. In one embodiment, this may be referred to as a "load." The load may be eligible to be "picked" for execution (510); as referred to herein, the "pick" at 510 may be called the "first pick". The "first pick" may use the first row combination of control signals in Table 1, as shown above. During the "first pick", the load's linear address may be sent to the TLB CAM 410 via line 440. If the TLB CAM 410 responds with a "miss" (i.e., not a "hit"), the flow may proceed to 520 where the translation for the load may be procured, for example using potential other TLB structures, a tablewalker (e.g., a mechanism that performs a look-up of a page table structure in memory to determine an address translation), or the like (all of which are known in the art) or some combination thereof. Upon procurement of the translation at 520, the load may be eligible again for a "first pick" and the flow may proceed to 510.

In one or more embodiments, a TLB "hit" may be determined (e.g., at 515, 545). The TLB CAM 410 may provide a "hit" output corresponding to the number of TLB CAM 410 entries for which a valid translation is stored/cached. The output may be a logical OR of the indication(s) of the one or more entries in the TLB CAM 410. That is, the TLB CAM 410 "hit" output may be asserted if any one of the entries in the TLB CAM 410 is a "hit". In one embodiment, the HitOutput 411 may be forced as asserted if the LoadUseBuffer line 455 is asserted. Once a TLB "hit" is obtained at 515, the memory type of the operation may be checked to determine if the load is cacheable (at 525). If the load is cacheable, the flow may proceed down a different path (not shown), for example checking a cache, store queue, and or the like, to get the correct data to execute the load instruction at 530. If it is determined at 525 that the load is non-cacheable, the load waits until it is the oldest instruction in the system instruction pipeline at 535. When the load is determined to be the oldest instruction, the load may be referred to as a non-speculative operation. When the load is determined to be the oldest instruction, a "second pick" may be made at 540 using the second combination of control signals, as shown in Table 1. As the TLB CAM 410 contents may have changed between the time of 505 and 540, a TLB "hit" is not guaranteed. The flow may proceed to 545, where if a TLB "miss" occurs, the flow may then proceed back to 520. After the translation is procured at 520, the flow may proceed again to 540 via line 522 (because the load has been determined to be the oldest instruction (535)) and the 540 process may be repeated as described above. If a TLB "hit" occurs at 545, the translation for the load may be stored by the oldest operation TLB buffer 420, and the load may then eligible for a "third pick" at 550. The "third pick" at 550 may use the last combination of signals as shown in Table 1 above, indicating the TLB circuitry 135 may use the translation that was stored during 540. During the "third pick" 550, a TLB "hit" is guaranteed; as such, the load may proceed directly to 555 where its non-cacheable transaction may be transmitted for execution.

Still referring to FIG. 5, in the case of a misaligned instruction load, the flow may be modified such that each portion of the misaligned instruction (e.g., each cache line) may be processed according to selection process 500. In such embodiments, the system may wait to execute the instruction until each portion of the misaligned instruction is determined to be the oldest instruction (540) and each portion of the misaligned instruction is stored in oldest operation TLB buffer 420a/b. Further, in such embodiments, the selection process 500 may be performed independently, sequentially, in parallel, substantially in parallel, or in an overlapping manner for each portion of a misaligned instruction.

It is contemplated that the elements as shown in FIG. 5 may not be limited to the order in which they are described above. In accordance with one or more embodiments, the elements shown in FIG. 5 may be performed sequentially, in parallel, or in alternate order(s) without departing from the spirit and scope of the embodiments presented herein. It is also contemplated that the flowcharts may be performed in whole, or in part(s), in accordance with one or more embodiments presented herein. That is, the flowcharts shown in the Figures need not perform every element described in one or more embodiments. Additionally, as mentioned above, the flow described in FIG. 5 may be applicable to cacheable instructions, for example, in cases for preventing live-locks. For example, cacheable loads may follow the same flow shown for non-cacheable loads, e.g., asserting the "second pick" and "third pick" signals as needed, in order to avoid live-lock problems.

Further, it is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs, SRAMs and/or DRAMs), compact discs, DVDs, solid state storage devices and/or the like). In one embodiment, the GDSII data (or other similar data) may be adapted to configure a manufacturing facility (e.g., through the use of mask works) to create devices capable of embodying various aspects described herein, in the instant application. In other words, in various embodiments, this GDSII data (or other similar data) may be programmed into a computer, processor or controller, which may then control, in whole or part, the operation of a semiconductor manufacturing facility (or fab) to create semiconductor products and devices. For example, in one embodiment, silicon wafers containing one or more CPUs 140, GPUs 125, TLB circuitry 135, hardware state machines and/or algorithms (not shown), caches 130, and/or the like may be created using the GDSII data (or other similar data).

It should also be noted that while various embodiments may be described in terms of TLB circuitry associated various processors or instruction execution, it is contemplated that the embodiments described herein may have a wide range of applicability, for example, in various devices that include processing devices, as would be apparent to one of skill in the art having the benefit of this disclosure.

The particular embodiments disclosed above are illustrative only, as the embodiments herein may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope of the claimed invention.

Accordingly, the protection sought herein is as set forth in the claims below.

The invention claimed is:

1. A method, comprising:
   dispatching an operation to a processing device;
   in response to determining that the operation is the oldest load operation:
      storing a translation for the operation in a buffer configured to hold only the translation for the oldest load operation in a processing system; and
      executing the operation using the translation.

2. The method of claim 1, further comprising:
   generating an address for the operation subsequent to the dispatching of the operation to a load-store unit.

3. The method of claim 2, further comprising:
   transmitting the address to a translation look-aside buffer (TLB); and
   determining whether the TLB returns an address hit or an address miss.

4. The method of claim 3, further comprising:
   performing a page translation in response to determining an address miss.

5. The method of claim 4, wherein performing the page translation comprises performing a tablewalk.

6. The method of claim 4, further comprising:
   performing one or more actions until an address hit is returned by the TLB, the one or more actions comprising:
      determining whether the TLB returns an address hit or an address miss in response to performing the page translation; and
      performing a subsequent page translation in response to determining the most recent address miss.

7. The method of claim 3, further comprising:
   performing, in response to determining an address hit, at least one of:
      determining that the operation is cacheable or non-cacheable;
      transmitting the address to the TLB in response to determining the operation is cacheable or non-cacheable and is the oldest load operation; and
      determining whether the TLB returns an address hit or an address miss for the oldest load operation.

8. The method of claim 7, further comprising:
   performing a page translation in response to determining the address miss for the oldest load operation.

9. The method of claim 7, wherein:
   storing the translation in the buffer is performed further in response to the address hit for the oldest load operation.

10. The method of claim 9, further comprising:
    accessing the translation for the oldest load operation from the buffer; and
    wherein executing the oldest load operation comprising executing the selected oldest load operation using the translation accessed from the buffer.

11. The method of claim 1, wherein the operation is at least one of a speculative operation or a non-cacheable operation.

12. The method of claim 1, wherein the operation is misaligned with respect to at least one of a cache line or a page.

13. The method of claim 12, wherein each portion of the misaligned operation has a respective, valid memory translation.

14. The method of claim 13, further comprising:
storing each portion of the translation for a misaligned operation in the buffer, wherein storing each portion of the translation for the misaligned operation in the buffer is performed in response to an address hit for each portion of the misaligned operation in the buffer is performed in response to an address hit for each portion of the misaligned operation.

15. The method of claim 14, wherein storing the translation for each portion of the misaligned operation comprises at least one of:
processing and storing each portion of the translation for the misaligned operation independently of each other;
processing and storing each portion of the translation for the misaligned operation sequentially; or
processing and storing each portion of the translation for the misaligned operation in parallel.

16. A non-transitory, computer-readable storage device encoded with data that, when executed by a processing device, adapts the processing device to perform a method, the method comprising:
dispatching an operation to the processing device;
in response to determining that the operation is the oldest load operation:
storing a translation for the operation in a buffer configured to hold only the translation for the oldest load operation in a processing system; and
executing the operation using the translation.

17. The non-transitory, computer-readable storage device encoded with data that, when executed by a processing device, adapts the processing device to perform the method as in claim 16, further comprising:
generating an address for the operation subsequent to the dispatching of the operation to a load-store unit.

18. The non-transitory, computer-readable storage device encoded with data that, when executed by a processing device, adapts the processing device to perform the method as in claim 17, further comprising:
transmitting the address to a translation look-aside buffer (TLB);
determining whether the TLB returns an address hit or an address miss; and
performing a page translation in response to determining an address miss.

19. The non-transitory, computer-readable storage device encoded with data that, when executed by a processing device, adapts the processing device to perform the method as in claim 18, wherein performing the page translation comprises performing a tablewalk, and further comprising:
performing one or more actions until an address hit is returned by the TLB, the one or more actions comprising:
determining whether the TLB returns an address hit or an address miss in response to performing the page translation; and
performing a subsequent page translation in response to determining the most recent address miss.

20. The non-transitory, computer-readable storage device encoded with data that, when executed by a processing device, adapts the processing device to perform the method as in claim 18, further comprising:
performing, in response to determining an address hit, at least one of:
determining that the operation is cacheable or non-cacheable;
transmitting the address to a translation look-aside buffer (TLB) in response to determining the operation is cacheable or non-cacheable and is the oldest load operation; and
determining whether the TLB returns an address hit or an address miss for the oldest load operation.

21. The non-transitory, computer-readable storage device encoded with data that, when executed by a processing device, adapts the processing device to perform the method as in claim 20, further comprising at least one of:
performing a page translation in response to determining the address miss for the oldest load operation; and
wherein storing the translation for the oldest load operation in the buffer is performed further in response to the address hit for the oldest load operation.

22. The non-transitory, computer-readable storage device encoded with data that, when executed by a processing device, adapts the processing device to perform the method as in claim 21, further comprising:
accessing the translation for the oldest load operation from the buffer; and
wherein executing the selected oldest load operation comprises executing the selected oldest load operation using the accessed translation.

23. The non-transitory, computer-readable storage device encoded with data that, when executed by a processing device, adapts the processing device to perform the method as in claim 16, wherein the operation is at least one of a speculative operation or a non-cacheable operation.

24. The non-transitory, computer-readable storage device encoded with data that, when executed by a processing device, adapts the processing device to perform the method as in claim 16, wherein the operation is misaligned with respect to at least one of a cache line or a page, and wherein each portion of the misaligned operation has a respective, valid memory translation.

25. The non-transitory, computer-readable storage device encoded with data that, when executed by a processing device, adapts the processing device to perform the method as in claim 24, further comprising:
storing each portion of the translation for the misaligned operation in the buffer, wherein storing each portion of the translation for the misaligned operation in the buffer is performed in response to an address hit for each portion of the misaligned operation; and
wherein storing each portion of the translation for the misaligned operation comprises at least one of:
processing and storing each portion of the translation for the misaligned operation independently of each other;
processing and storing each portion of the translation for the misaligned operation sequentially; or
processing and storing each portion of the translation for the misaligned operation in parallel.

26. An apparatus, comprising:
a translation look-aside buffer (TLB) content addressable memory (CAM);
an oldest operation storage buffer operationally coupled to the TLB CAM, wherein the oldest operation storage buffer is configured to hold only the translation for the oldest load operation in a processing system; and
an output multiplexor operationally coupled to the TLB CAM and to the oldest operation storage buffer.

27. The apparatus of claim 26, further comprising:
an input multiplexor, wherein the output multiplexor and the oldest operation storage buffer are respectively operationally coupled to the TLB CAM through the input multiplexor.

28. The apparatus of claim 27, further comprising:
a load queue adapted to transmit one or more signals to at least one of the TLB CAM, the input multiplexor, the oldest operation storage buffer, or the output multiplexor.

29. The apparatus of claim 28, wherein the load queue is further adapted to:
receive one or more signals from at least one of the TLB CAM, the input multiplexor, the oldest operation storage buffer, or the output multiplexor; and
update the state of at least one load queue entry based upon the one or more received signals.

30. The apparatus of claim 26, wherein the output multiplexor is configured to select as an input one of data from the oldest operation storage buffer or data from the TLB CAM based on a first input signal.

31. The apparatus of claim 26, wherein the output multiplexor is configured to transmit an output to a load-store unit of a processing device.

32. A non-transitory, computer-readable storage device encoded with data that, when executed by a fabrication facility, adapts the fabrication facility to manufacture an apparatus, the apparatus comprising:
a translation look-aside buffer (TLB) content addressable memory (CAM);
an oldest operation storage buffer operationally coupled to the TLB CAM, the oldest operation storage buffer configured to hold only the translation for the oldest load operation in a processing system; and
an output multiplexor operationally coupled to the TLB CAM and to the oldest operation storage buffer.

* * * * *